United States Patent
Hasumi (10) Patent No.: US 12,025,214 B2
(45) Date of Patent: Jul. 2, 2024

(54) GEAR MECHANISM

(71) Applicant: Shimadzu Corporation, Kyoto (JP)

(72) Inventor: Manabu Hasumi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 260 days.

(21) Appl. No.: 17/602,203

(22) PCT Filed: Jun. 20, 2019

(86) PCT No.: PCT/JP2019/024568
§ 371 (c)(1),
(2) Date: Oct. 7, 2021

(87) PCT Pub. No.: WO2020/255349
PCT Pub. Date: Dec. 24, 2020

(65) Prior Publication Data
US 2022/0065342 A1     Mar. 3, 2022

(51) Int. Cl.
*F16H 55/12*     (2006.01)
*F16H 55/17*     (2006.01)

(52) U.S. Cl.
CPC .......... *F16H 55/12* (2013.01); *F16H 55/17* (2013.01)

(58) Field of Classification Search
None
See application file for complete search history.

(56) References Cited

FOREIGN PATENT DOCUMENTS

| DE | 20 2010 005 941 U1 | | 8/2010 |
|---|---|---|---|
| JP | 04-064756 A | | 2/1992 |
| JP | 2005-207454 A | | 8/2005 |
| JP | 2009-180299 A | | 8/2009 |
| JP | 2009180299 A | * | 8/2009 |
| JP | 2012-000628 A | | 1/2012 |

OTHER PUBLICATIONS

Office Action dated Oct. 18, 2022 issued for corresponding JP patent application No. 2021-528575.
International Search Report dated Aug. 6, 2019 issued for International application No. PCT/JP2019/024568.
Written Opinion of the International Searching Authority dated Aug. 6, 2021 issued for International application No. PCT/JP2019/024568.

* cited by examiner

*Primary Examiner* — Vicky A Johnson
(74) *Attorney, Agent, or Firm* — Muir Patent Law, PLLC (57) ABSTRACT

Provided is a gear mechanism in which power transmission efficiency is good and strength of gear does not reduce. The gear mechanism 10 is provided with a gear body 12 in which a plurality of gears is stacked in a rotation axis direction, each gear being equipped with a disk portion 16 and a plurality of teeth 18 arrange at equal intervals on the outer periphery of the disk portion 16. The plurality of stacked gears 14 is shifted in the rotation direction such that the contact ratio is 1 or more. When the reference module of the gear 14 is m', the diameter of the pitch circle is d, the number of teeth of the gear 14 is zA, and the number of gears 14 is a, m'=d/(zA×a) is satisfied.

5 Claims, 10 Drawing Sheets

GEAR MECHANISM

TECHNICAL FIELD

The present invention relates to a gear mechanism.

BACKGROUND ART

Figure 10:
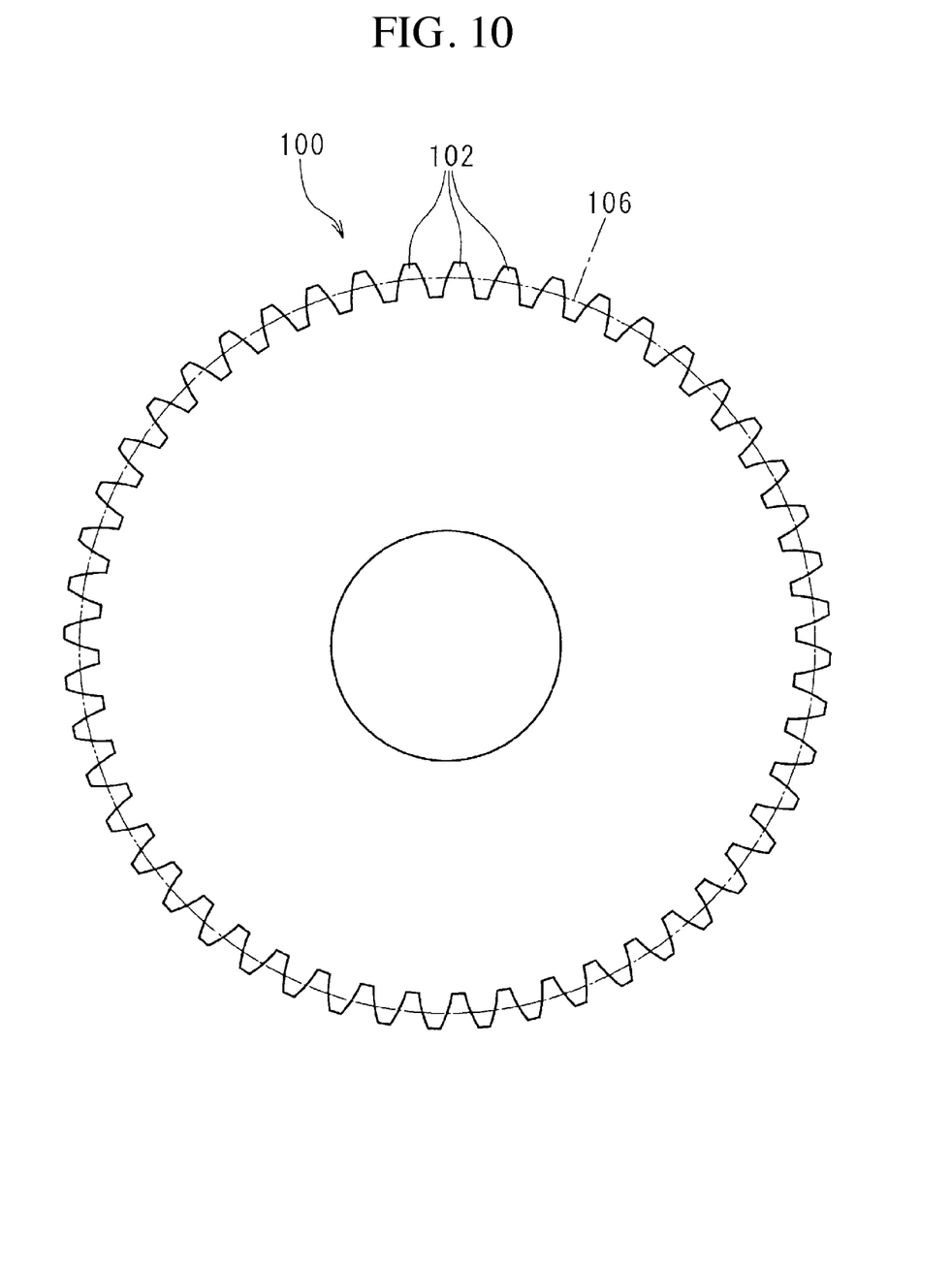
FIG. 10 is a diagram showing a conventional involute gear.
Figure 11:
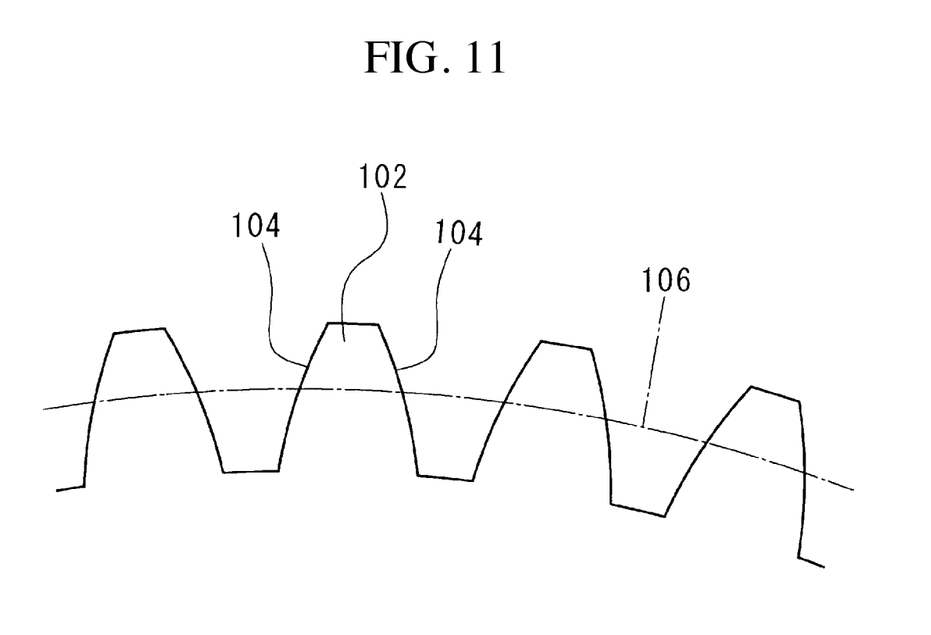
FIG. 11 is an enlarged view of the tooth of the involute gear of FIG. 10.

Conventionally, as described in the below-listed Patent Document 1 or the like, an involute gear is known. The tooth 102 of the involute gear 100 shown in FIGS. 10 and 11 is provided with a tooth surface 104 formed in an involute curve. The sliding ratio between teeth 102 is low at the pitch circle 106 of the tooth surface 104 and its vicinity (near the center of the tooth surface) and increases as it advances toward the tooth tip and the tooth bottom. By lowering the tooth depth of the tooth 102, a low sliding ratio area near the center of the tooth surface 104 can be efficiently used, which in turn can transmit power with high efficiency.

PRIOR ART DOCUMENT

Patent Document

Patent Document 1: Japanese Unexamined Patent Application Publication No. 2012-000628

SUMMARY OF THE INVENTION

Problems to be Solved by the Invention

However, if the tooth depth is reduced with the pitch circle 106 kept constant, the tooth 102 is reduced in size, resulting in reduced strength of the tooth 102. Therefore, the tooth depth cannot be reduced, and therefore the power transmission efficiency cannot be increased.

An object of the present invention is to provide a gear mechanism that is good in power transmission efficiency and does not reduce the strength of the gear.

Means for Solving the Problems

In order to solve the above-described problems, a gear mechanism according to the present invention has the following configuration.

A gear mechanism according to the present invention is provided with a gear body in which a plurality of gears is stacked in a rotation axis direction and fixed to each other, each of the plurality of gears being provided with a disk portion and a plurality of teeth arranged at equal intervals on an outer periphery of the disk portion. In the tooth surface of the tooth, the plurality of stacked gears is shifted in a rotation direction such that a contact ratio is 1 or more.

Effects of the Invention

According to the present invention, the friction loss of the tooth surface can be reduced because the tooth depth is reduced and only the region near the pitch circle where the sliding ratio of the tooth surface is low is used.

EMBODIMENTS FOR CARRYING OUT THE INVENTION

A gear mechanism according to an embodiment of the present invention will be described with reference to the attached drawings. Although some embodiments will be described, the same reference symbol may be allotted to the same component even in a different embodiment to omit the description.

Embodiment 1

Figure 1:
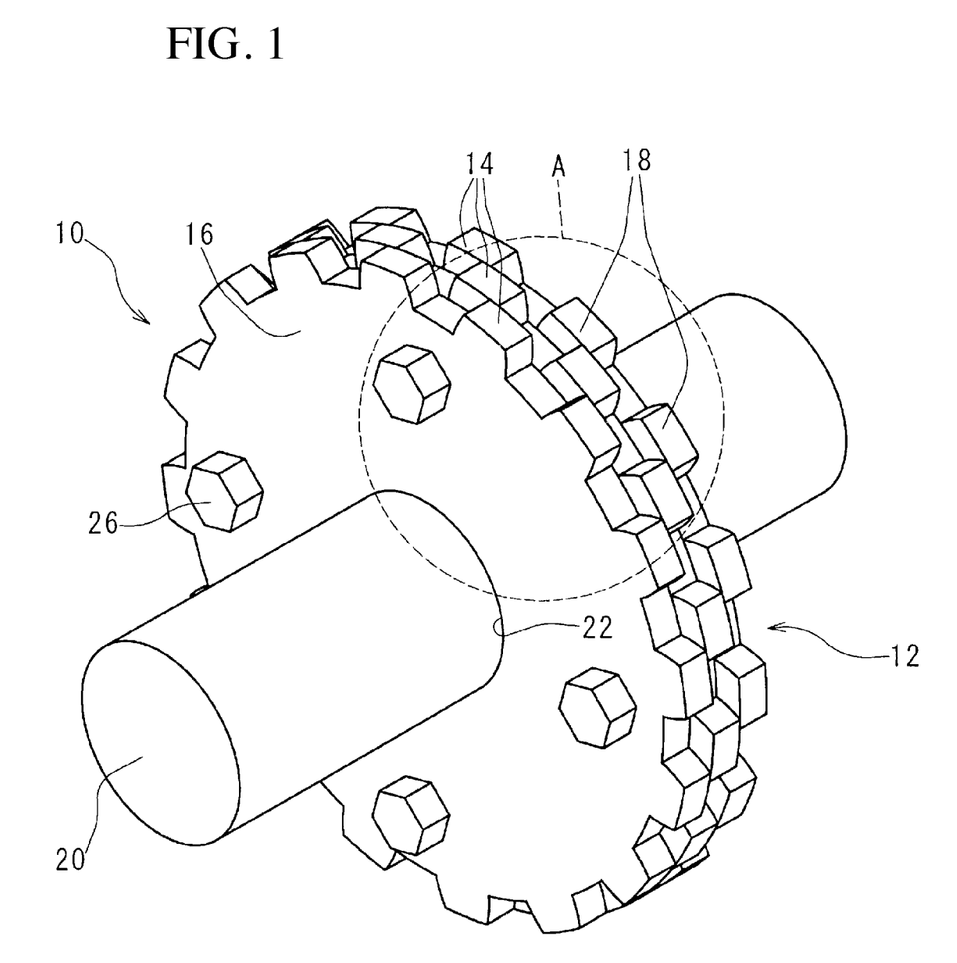
FIG. 1 is a perspective view showing a gear mechanism according to the present invention.

A gear mechanism 10 according to the present disclosure shown in FIG. 1 is provided with a gear body 12. The gear body 12 is provided with a plurality of gears 14. Each gear 14 is provided with a disk portion 16 and a plurality of teeth 18 provided on the outer periphery of the disk portion 16. When the two gear bodies 12 are rotated with their teeth 18 engaged, power is transmitted from one gear body 12 to the other gear body.

[Gear Body]

All of gears 14 constituting one gear body 12 are fixed to the same rotation shaft 20. The number of gears 14 is plural, and all of the gears 14 are of the same shape. In this embodiment, a case in which the number of gears 14 is three will be described.

The thickness of the gear body 12 may be the same as a thickness of a conventional gear. By thinning each gear 14 such that the entire thickness of the gear body 12 becomes the same thickness as a conventional gear, it is possible to apply the gear mechanism 10 according to the present disclosure to the same gear mechanism as a conventional one.

Figure 2:
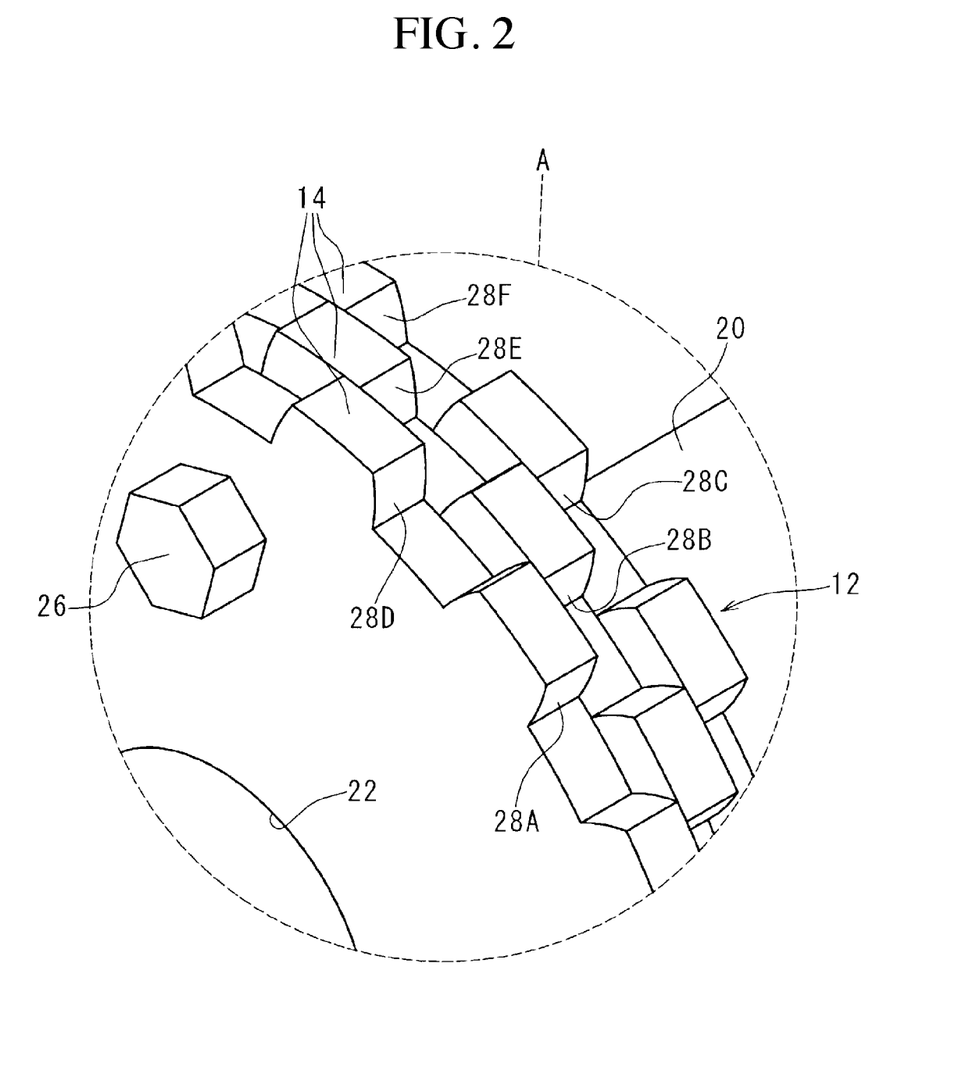
FIG. 2 is an enlarged view of a portion indicated by the circle A in FIG. 1.

The disk portion 16 is provided with a shaft hole 22 in the central portion thereof. In a state in which a rotation shaft 20 is fitted in the shaft hole 22, the rotation shaft 20 and the disk portion 16 are fixed. As shown in FIGS. 1 and 2, the plurality of gears 14 are fixed in a state of being stacked one on the other, and the adjacent gears are arranged in a state of being shifted by equal angles in a rotation direction. All of the gears 14 rotate simultaneously, and when the two gear bodies rotate in an engaged state, the mating gear in each gear body changes in sequence.

The method for integrally securing the plurality of gears 14 is arbitrarily adopted. For example, all of the gears 14 may be secured to each other by inserting a shaft of a bolt 26 into the hole 24 (FIG. 3) provided in the disk portion 16 and securing a nut to the bolt 26. Note that a rivet may be used instead of the bolt 26.

[Gear]

Figure 3:
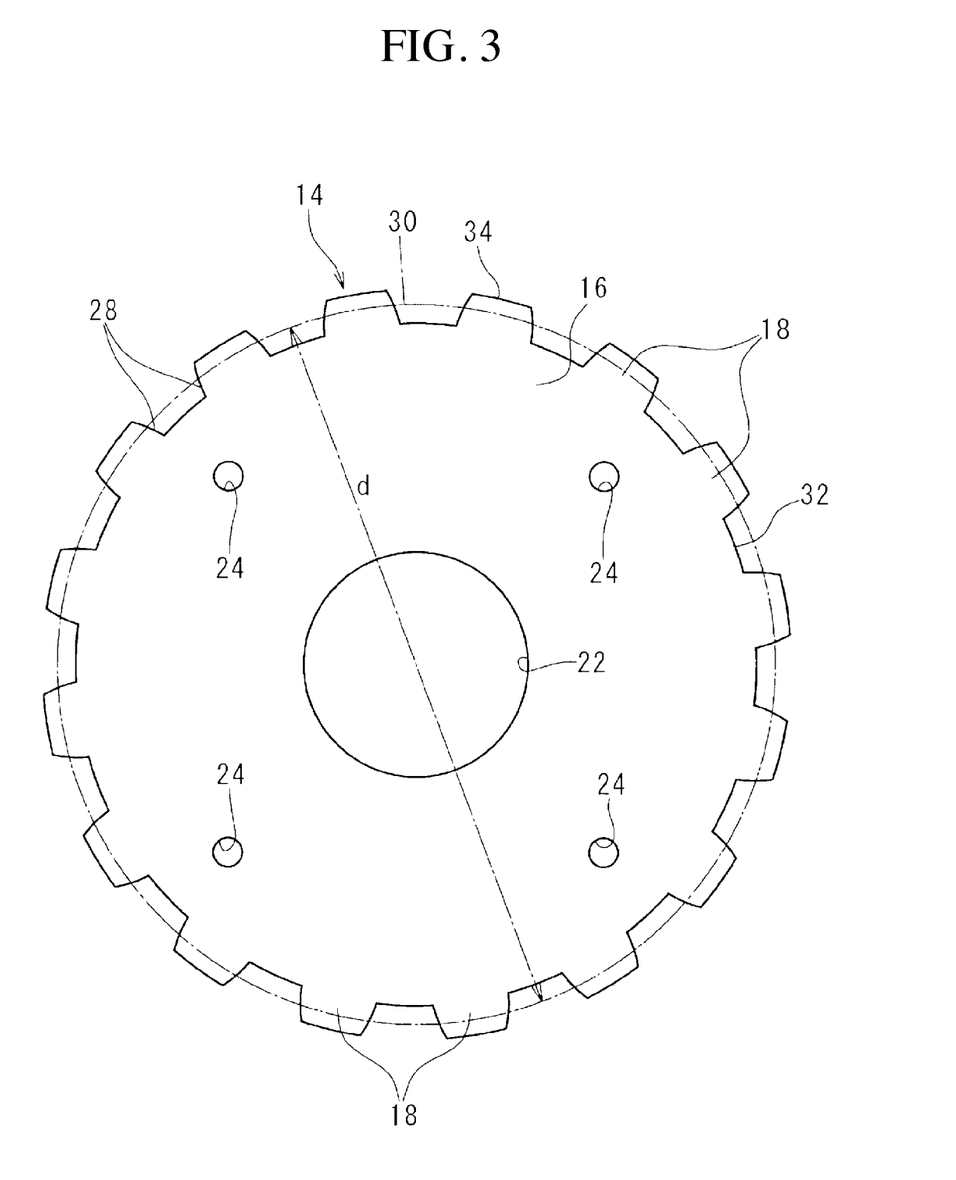
FIG. 3 shows a gear used for the gear mechanism according to the present invention.

As shown in FIG. 3, in the gear 14, a plurality of teeth 18 is arranged at the same pitch. The tooth surface 28 of each tooth 18 is formed in an involute curve shape. All of the gears 14 are involute gears.

Figure 4:
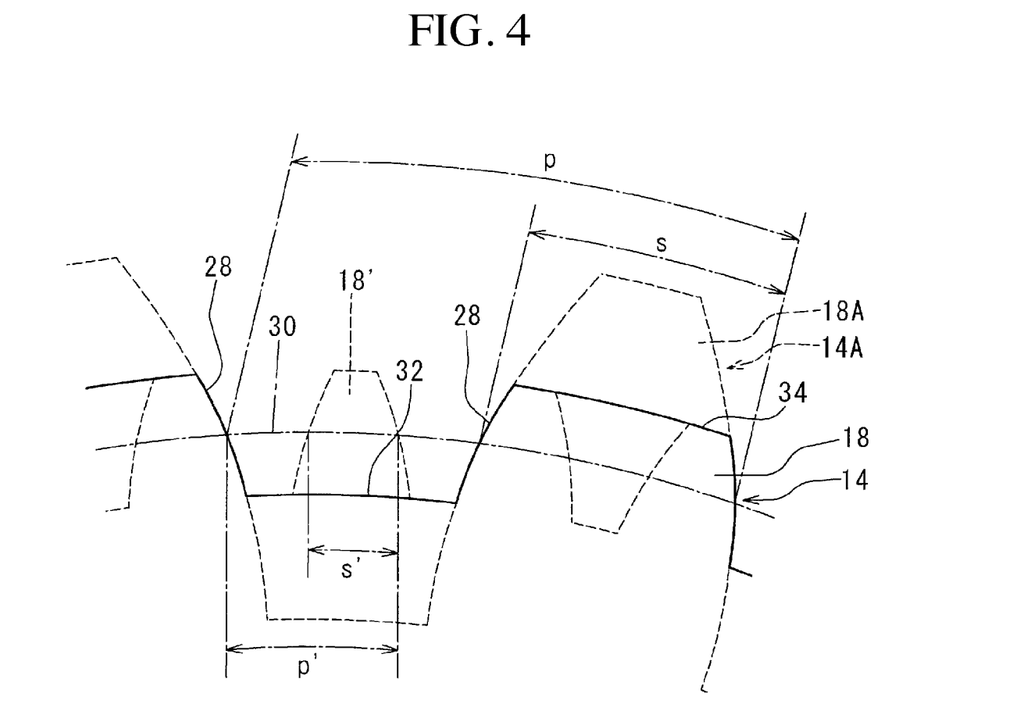
FIG. 4 is an enlarged view showing the pitch of the gear.

As shown in FIG. 4, in a conventional involute gear 14A equipped with teeth 18A, when the module is mA (mm), the diameter of the pitch circle (reference circle) 30 is d (mm), and the number of teeth is zA, the module of the involute gear 14A is mA=d/zA. The module m' of the tooth 18' is smaller than the module mA by the number a of the gear 14, i.e., m'=mA/a=d/(zA×a). For example, in a case where three gears 14 are used, the module m' becomes ⅓ of the module of the conventional involute gear 14A, i.e., m'=d/(zA×a). The tooth number z' of the gear equipped with the tooth 18' is three times the conventional involute gear 14A, i.e., z'=zA×3. The tooth 18 of the gear 14 according to the present disclosure is referenced to this small tooth 18'.

As shown in FIG. 4, in the reference tooth 18' in which the tooth depth is reduced by the number a of the gear 14, when the pitch is p' (mm) in the pitch circule 30 and the ratio of the circumference of the circle to its diameter is π, the pitch p' is represented by the equation: p'=π×m'=π×mA/a. Further, the tooth thickness s' is p'/2. By arranging "a" pieces of the gears 14 are arranged in a shifted manner, the gear engagement can be ensured even if the pitch of the gear 14 is increased by "a" times the pitch of the reference tooth 18', and therefore the pitch p of the gear 14 can be made to p'×a, i.e., p=p'×a. The pitch p is the same as the pitch of the tooth 18A. As a result, the tooth thickness s of the gear 14 can also be lengthened by the number "a" of the gear 14 with respect to the reference tooth 18', and therefore s=s'×a=p/2=π×m'×a/2. The number of teeth of the gear 14 is z=z'/a=zA.

Two gear bodies 12 each equipped with the above-described gear 14 can be engaged to each other. In the two engaging gear bodies 12, the gear 14 configuring each gear body 12 may be different from each other in the diameter d of the pitch circle 30 and the number z of teeth.

Figure 5:
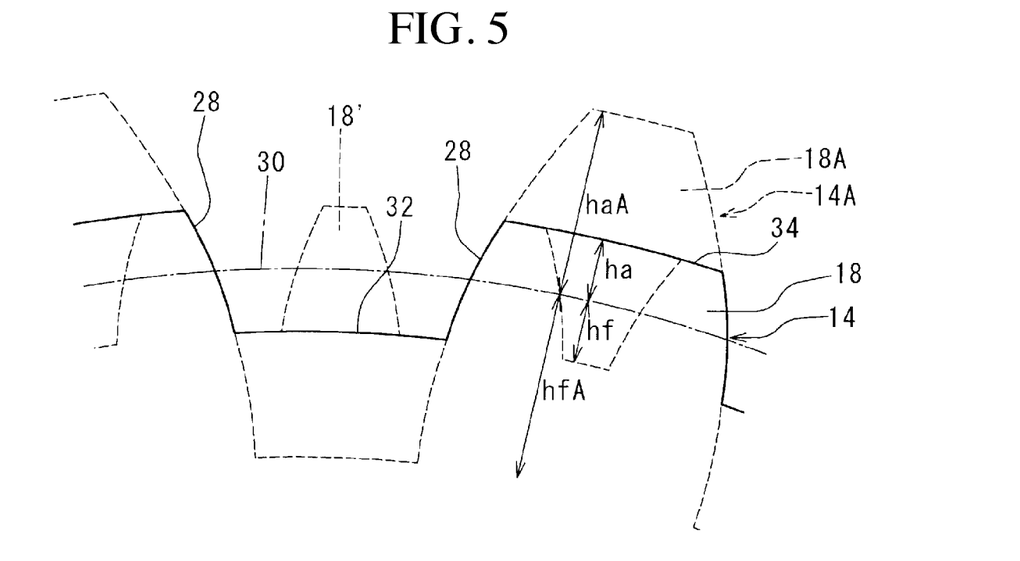
FIG. 5 is an enlarged view showing the tooth depth of the gear.

As shown in FIG. 5, the addendum of the tooth 18A of the conventional involute gear 14A is haA=mA. The dedendum is hfA=mA. On the other hand, the addendum of the gear 18 according to the present disclosure is ha=m'=mA/a. The dedendum is hf=m'=mA/a. As described above, the top and root areas of the tooth according to the present disclosure are reduced by the number a of the gear 14. Thus, the tooth depth of the gear 18 according to the present disclosure, which is equal to ha+hf, is inversely proportional to the tooth depth of the conventional involute gear 14A, which is equal to haA+hfA. Compared with the tooth 18A of the conventional involute gear 14A, the tooth 18 according to the present disclosure uses only the tooth surface 28 in the vicinity of the pitch circle 30, which is small in the sliding ratio. Furthermore, as compared with the conventional gear 18A, in the gear 18, the tooth thickness is the same, and the tooth depth of the gear is 1/a. Therefore, the same strength can be ensured even if the tooth width is set to 1/a.

In the present disclosure, it is configured such that the top and root areas of the tooth 18A have been deleted. In other words, in the present disclosure, the top and root areas are reduced by the number a of the gear 14, and the tooth surface 28 to be used is set in the vicinity of the pitch circle 20 so as to include the pitch circle 30. The tooth surface 28 is configured by a portion of the tooth 18A low in the sliding ratio.

As shown in FIGS. 4 and 5, the tooth 18 of the gear 14 according to the present disclosure is a tooth in which the top and root areas of the tooth 18A of the conventional involute gear 14A are deleted. In the gear according to the present invention, there is no engagement by the top and root areas in the conventional involute gear 14A. Therefore, the adjacent gears 14 are shifted by an equal angle about the rotational center of the rotation shaft 20. For example, in a case where three pieces of gears are used as shown in FIG. 1 and the number of teeth in each gear 14 is 16, the adjacent gears 14 are shifted by 7.5 degrees. When the two gear bodies 12 are rotated in an engaged manner, at the timing when the engaging of one of the gears 14 is finished, the other of the gears 14 is engaged. A plurality of gears 14 are engaged in sequence. For example, as shown in FIG. 2, the tooth surfaces 28A to 28F are engaged in order. For this reason, in the present disclosure, the conventional engagement of the top and root areas of the teeth is compensated by the plurality of gears 14.

As described above, in the present disclosure, the module m' of the reference small tooth 18' can be made smaller than the module mA by the number of gears 14. Therefore, it is possible to reduce the tooth depth of the gear 14, which in turn can miniaturize the gear 14. The tooth thickness s increases than the tooth thickness s' by the number of gears 14, and therefore the tooth thickness s can be increased. Further, since the tooth depth is reduced, and therefore the strength of the tooth 18 is equivalent to that of the tooth 18A even if the thickness of the gear 14 is reduced. Therefore, by thinning the gear 14 and stacking a plurality of gears 14, the thickness can be set to the same as the thickness of the conventional gear 14. Compared with the conventional gear mechanism, it is possible to provide a gear mechanism 10 by simply changing the gear 14 with respect to the conventional gear mechanism, and therefore it is not necessary to change the structure of the periphery of the gear mechanisms 10.

Embodiment 2

Figure 6:
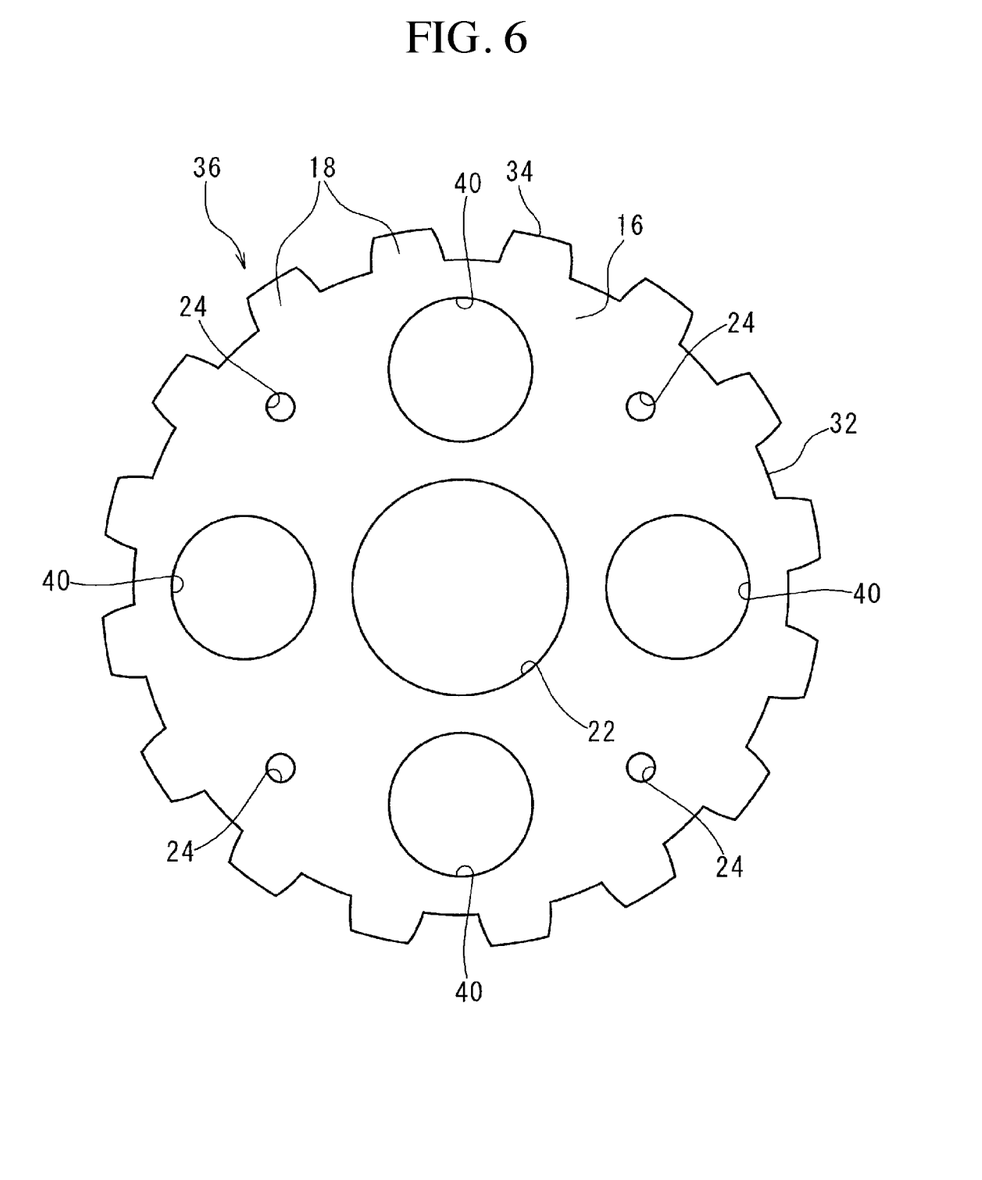
FIG. 6 is a diagram showing a gear in which weight-reduction holes are provided in a disk portion.
Figure 7:
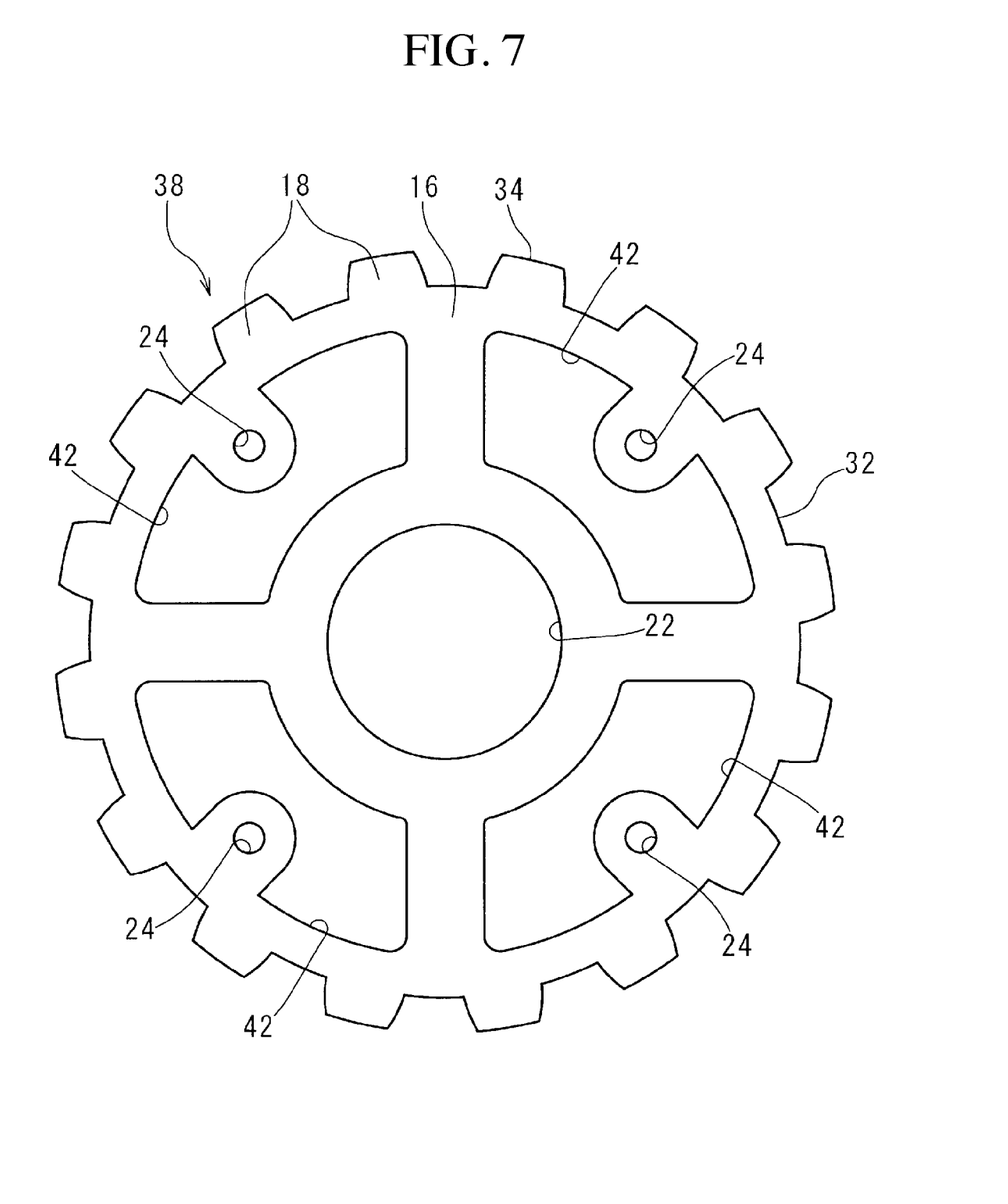
FIG. 7 is a diagram showing a gear in which weight-reduction holes are provided in a disk portion.

As shown in FIGS. 6 and 7, the disk portion 16 of the gear 36, 38 may be provided with weight-reduction holes 40, 42. The weight-reduction hole 40, 42 can reduce the weight of the gear 36, 38. The number and shape of the weight-reduction hole 40, 42 may be arbitrarily determined. A gear mechanism for use in an aircraft is required to attain the weight reduction, and the present disclosure 10 can be applied to an aircraft and other applications. In the gear 38 shown in FIG. 7, the length from the tooth bottom 32 to the weight-reduction hole 42 is set according to the tooth depth. Therefore, in the configuration according to the present disclosure in which the tooth depth is reduced, the weight-reduction can be performed by thinning this portion.

Embodiment 3

Figure 8:
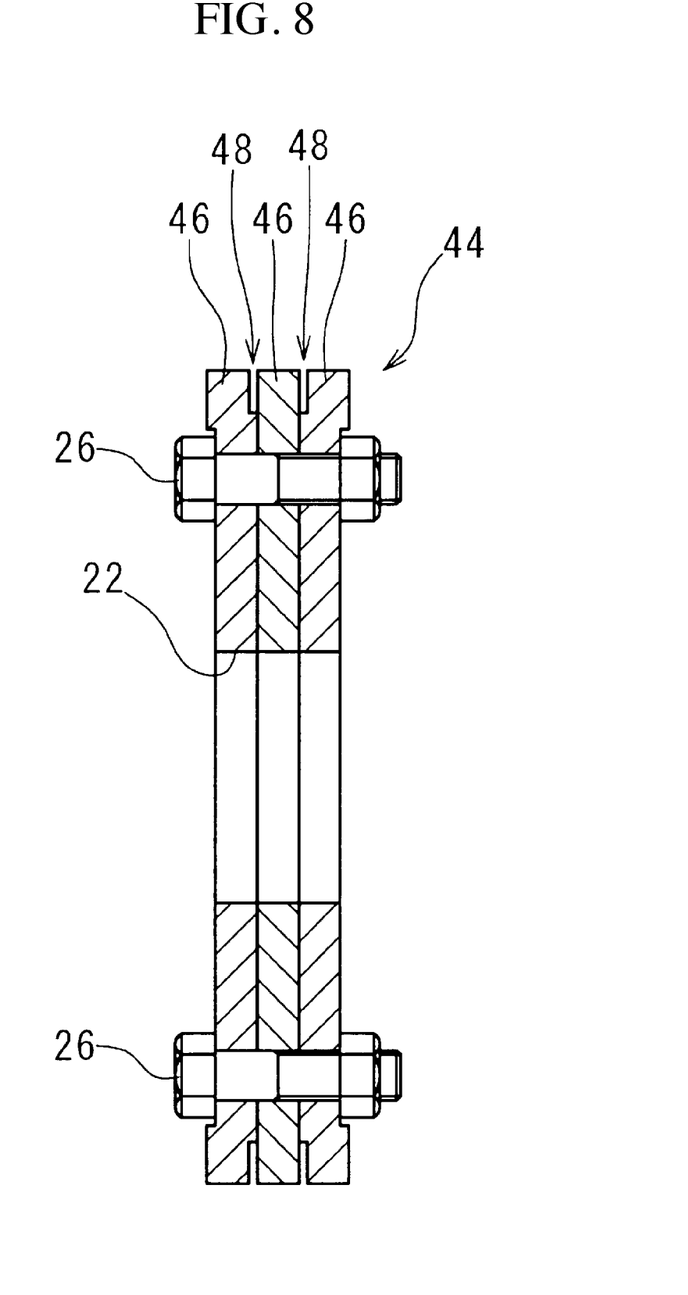
FIG. 8 is a cross-sectional view showing a gear unit in which a gap is formed between teeth.

As in the gear body 44 shown in FIG. 8, it may be configured such that a gap 48 is formed between adjacent gears 46. The gap 48 is formed at least on the side of the tooth. With this, when the two gear bodies 44 are engaged with each other, it is less likely to cause interference between the teeth. Further, as the tooth width reduces in the thickness, lubricating oil and air in the engagement portion of the gears are easily discharged, so that the efficiency can be improved.

Embodiment 4

Figure 9:
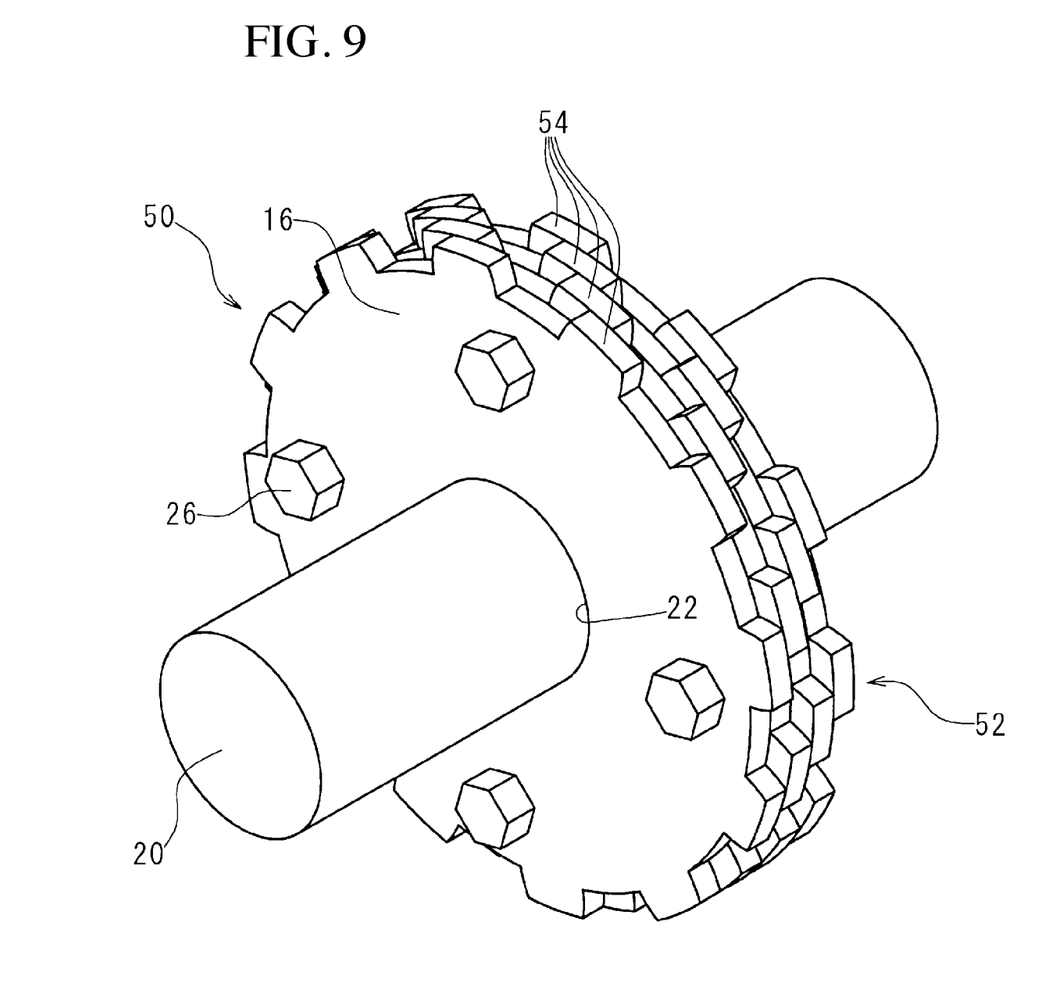
FIG. 9 is a perspective view showing a gear mechanism having a gear unit using four gears.

As in the gear mechanism 50 shown in FIG. 9, the gear body 52 may be composed of four pieces of gears 54. The four pieces of gears 54 are shifted in the rotation direction at an equal pitch. Note that the number of gears 54 provided in the gear body 52 is not limited as long as the number is plural.

Embodiment 5

In the above-described embodiments, embodiments are described in which as in the gear mechanism 10, 50 shown in FIGS. 1 and 9, the gears 54 are shifted at an equal pitch in the rotation direction, but the shift angle may not be an equal pitch. For example, the shift angle is not limited if it is in a state in which the teeth 28B starts engaging at the end of the engagement of the teeth 28A shown in FIG. 2. That is, as long as the contact ratio of the two gear bodies 12, 44, 52 is 1 or more, the shift angle is not limited.

Embodiment 6

In the above-described embodiments, the descriptions are directed to the case in which the gear 14, 34, and 36 is an involute spur gear, but the gear 14, 34, and 36 may be another gear. For example, the gear may be a helical gear or a bevel gear.

Embodiment 7

In the above-described embodiment, the descriptions are directed to the case in which all the gears 14 are formed in the same shape, but the gears are not always required to be in the same shape. For example, the gears may have different tooth bottoms 32 in a case where a certain strength deterioration is allowed. Also, for example, in a case where certain efficiency reduction is allowed, a gear mechanism in which only one gear has a tooth depth different from others may be adopted as long as the contact ratio becomes 1 or more.

(Item 1)

A gear mechanism according to the present disclosure is provided with:
- a gear body in which a plurality of gears is stacked in a rotation axis direction and fixed to each other, each of the plurality of gears being provided with a disk portion and a plurality of teeth arranged at equal intervals on an outer periphery of the disk portion,
- wherein the plurality of stacked gears is shifted in a rotation direction such that a contact ratio is 1 or more.

According to the gear mechanism as described in the above-described Item 1, the sliding ratio in the vicinity of the pitch circle is low.

(Item 2)

A tooth surface is located at a position including a pitch circle of the gear and a vicinity thereof.

According to the gear mechanism described in the above-described Item 2, the tooth surface is located at the position including the pitch circle and the vicinity thereof, and therefore the portion low in the sliding ratio can be used.

(Item 3) When a reference module of the gear is m', a diameter of the pitch circle is d, the number of teeth of the gear is zA, and the number of gears is a, the reference module m' is expressed by the following equation:

$$m' = d/(zA \times a).$$

According to the gear mechanism as described in the above-described Item 3, the tooth depth of the gear is reduced by the number of gears equipped in the gear body, and therefore the gear can be designed to be small. Compared with the gear, the tooth depth of the gear is 1/a.

(Item 4)

When a pitch of the teeth of the gear is p and a ratio of a circumference of a circle to its diameter is π, the pitch p is expressed by the following equation:

$$p = \pi \times m' \times a, \text{ and}$$

a tooth thickness s is expressed by the following equation:

$$s = p/2 = \pi \times m' \times a/2.$$

According to the gear mechanism described in the above-described Item 4, the pitch p of the teeth can be increased by the number of the gear provided in the gear body, and the tooth thickness s can be increased. The tooth can be increased in the rotation direction of the gear, and therefore the strength of the tooth can be increased.

(Item 5)

When an addendum of the tooth is ha and a dedendum of the tooth is hf, the following relation is satisfied:

$$ha = hf = m'.$$

According to the gear mechanism described in the above-described Item 5, the total tooth depth ha+hf of the tooth can be reduced.

Further, the present invention can be implemented in a manner in which various improvements, changes, and changes are made based on the knowledge of skill in the art without departing from the spirit and scope of the present invention.

DESCRIPTION OF SYMBOLS

10, 50: Gear mechanism
12, 44, 52: Gear body
14, 14A, 36, 38, 46, 54: Gear
16: Disk portion
18, 18A, 18': Tooth
20: Rotation shaft
22: Shaft hole
24: Hole
26: Bolt
28, 28A, 28B, 28C, 28D, 28E, 28F: Tooth surface
30: Pitch circle
32: Tooth bottom
34: Addendum
40, 42: Weight-reduction hole
48: Gap

The invention claimed is:

1. A gear mechanism comprising:
   a gear body in which a plurality of gears is stacked in a rotation axis direction and fixed to each other, each of the plurality of gears being provided with a disk portion and a plurality of teeth arranged at equal intervals on an outer periphery of the disk portion,
   wherein the plurality of stacked gears is shifted in a rotation direction such that a contact ratio is 1 or more, and
   wherein a tooth depth of the plurality of teeth equipped by each gear is lower than a tooth depth of a standard tooth form of a gear in which a diameter of a pitch circle and the number of teeth are the same as those of each of the plurality of gears.

2. The gear mechanism as recited in claim 1,
   wherein a tooth surface is located at a position including a pitch circle of the gear and a vicinity thereof.

3. The gear mechanism as recited in claim 2,
wherein when a reference module of the gear is m', a diameter of the pitch circle is d, the number of teeth of the gear is zA, and the number of gears is a,
the reference module m' is expressed by the following equation:

$$m' = d/(zA \times a).$$

4. The gear mechanism as recited in claim 3,
wherein when a pitch of the teeth of the gear is p, and a ratio of a circumference of a circle to its diameter is π,
the pitch p is expressed by the following equation:

$$p = \pi \times m' \times a, \text{ and}$$

a tooth thickness s is expressed by the following equation:

$$s = p/2 = \pi \times m' \times a/2.$$

5. The gear mechanism as recited in claim 4,
wherein when an addendum of the tooth is ha, and a dedendum of the tooth is hf, the following relation is satisfied:

$$ha = hf = m'.$$

* * * * *